United States Patent [19]

Fasanaro et al.

[11] Patent Number: 4,470,834

[45] Date of Patent: Sep. 11, 1984

[54] AIR FILTER

[75] Inventors: Guy C. Fasanaro; Kenneth B. Taylor, both of Benicia; Gerald J. Frades, Antioch, all of Calif.

[73] Assignee: Grabber Enterprises, Oakley, Calif.

[21] Appl. No.: 446,287

[22] Filed: Dec. 2, 1982

[51] Int. Cl.³ .............................................. B01D 46/10
[52] U.S. Cl. ....................................... 55/501; 55/509; 55/DIG. 6
[58] Field of Search ................. 55/495, 501, 502, 505, 55/509, 511, 515, 518, 519, 529, DIG. 6, DIG. 20, DIG. 31

[56] References Cited

U.S. PATENT DOCUMENTS

| | | | |
|---|---|---|---|
| 2,677,436 | 5/1954 | Mazek | 55/DIG. 31 |
| 2,952,342 | 9/1960 | Schnittker | 55/DIG. 31 |
| 3,164,456 | 1/1965 | Brainerd, Jr. et al. | 55/502 |
| 3,429,434 | 2/1969 | Hickin | 55/519 |
| 3,793,692 | 2/1974 | Tate et al. | 55/DIG. 31 |
| 3,912,473 | 10/1975 | Wilkins | 55/511 |

Primary Examiner—David Lacey
Attorney, Agent, or Firm—Townsend and Townsend

[57] ABSTRACT

An air filter for use with wood or coal stoves of the type having a plenum surrounding the firebox. The air filter includes a porous framework in the shape of a C-shaped channel which houses a filter pad. The outer and inner surfaces of the framework are porous and substantially open. The framework is preferably of a relatively stiff, but deformable, open weave material bounded along its edges by a circumferential frame. The inner surface defines an access opening through which the filter pad can be inserted. The air filter is sized to cover a recirculating air inlet of the stove. Magnetic strips allow the air filter to be easily and quickly mounted to the stove without modification.

4 Claims, 8 Drawing Figures

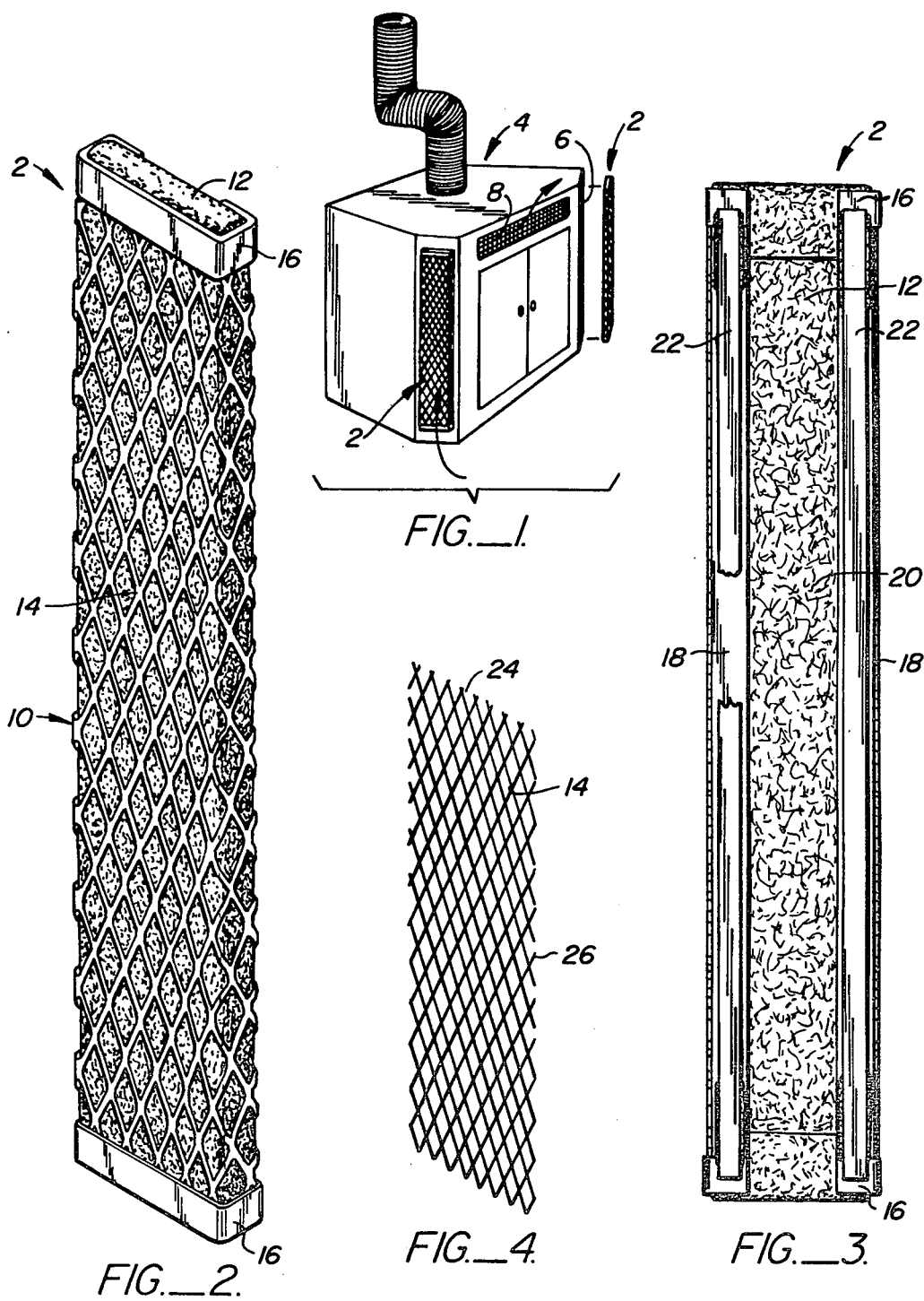

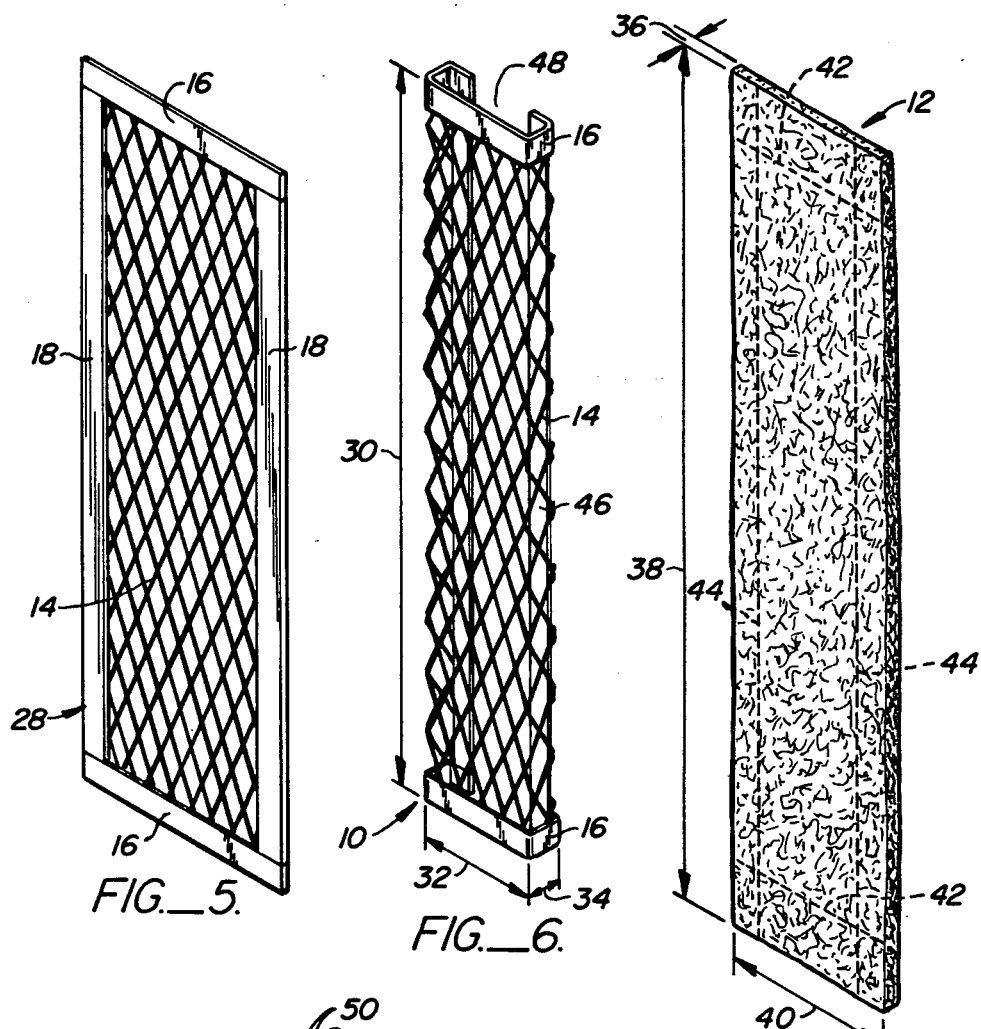
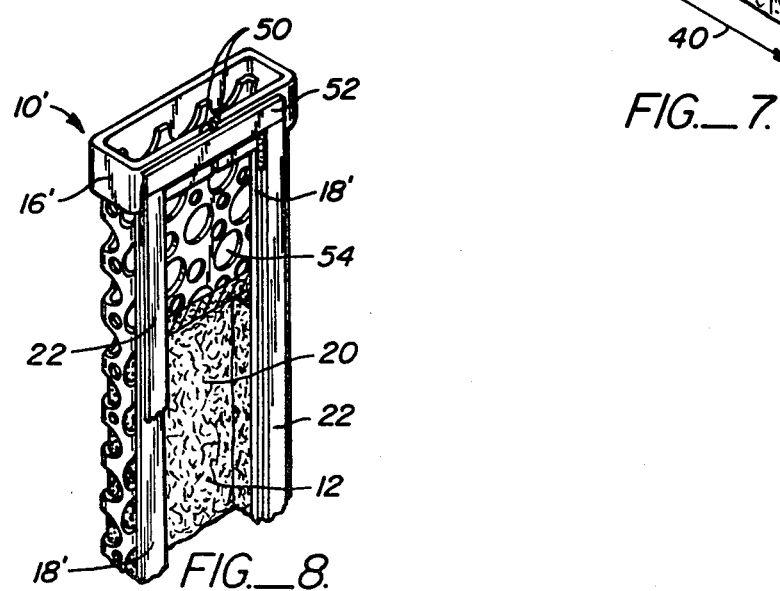

AIR FILTER

DESCRIPTION

Background of the Invention

This invention relates to filters, particularly an air filter magnetically attached to a recirculation air intake of a wood stove.

The increase in popularity of using wood stoves for heating one's home is well known. Wood stoves, however, are not without their drawbacks. One of these concerns introduction of dust and other airborne particulates into the air within the home by the stove. Besides soiling one's home, the increase in airborne particulates can be unpleasant or even unhealthy to those with dust-related allergies.

Summary of the Invention

The invention is an air filter device adapted for use with wood or coal stoves of the type having an air heating plenum surrounding the firebox. The air filter includes a porous framework in the shape of a C-shaped channel which houses a filter pad. The framework includes a porous, substantially open outer surface, lateral edges and an inner surface. The inner surface preferably includes a pair of elongate inner edges defining an access opening therebetween. The framework is preferably of a relatively stiff, but deformable, open weave material, such as expanded metal, bounded along the upper and lower ends by solid strips. The opposed inner surface portions are likewise preferably bounded by solid strips. Elongate magnetic strips are bonded to the outer surface of the strips bordering the inner edges.

The filter pad is housed within the framework. The filter pad is mounted within the framework by insertion through the access opening. The air filter is sized to cover the air inlet of the stove to filter air entering the plenum of the stove. The stove, being of a ferrous material, at least in the region surrounding the air inlet, permits the air filter to be easily and quickly mounted to the stove to cover the air inlet. The filter is sized so that the magnetic strips laterally straddle the air inlet so as not to obstruct air flow. The magnetic strips, extending substantially the entire length of the air filter, thus act both to mount the air filter to the stove and seal the region between the inner edges of the air filter and the stove.

The thickness of the framework is about double the thickness of the filter pad. The filter pad is larger than the outer surface so the edges of the filter pad must be doubled over to fit within the framework. This insures that all air passing into the air inlet passes through the filter pad.

A primary feature of the invention is the inclusion of the magnetic strip along the inner edges which both mount the air filter to the stove and provide a seal between the air filter and the stove. Being magnetically mounted, such a filter can be installed on existing models with no modification to the stove. Removal for cleaning the filter pad is also easy because of the magnetic attachment.

Another feature of the invention is the provision of the access opening over the entire or substantially the entire length of the inner surface. This allows the filter pad to be conveniently inserted within the framework, a particular advantage when the filter is relatively long and narrow.

The air filter of the invention is made by cutting a piece of mesh material into a rectangular shape. Edging strips are attached, such as by spot welding, along the edges of the mesh to form a frame about the mesh. The framed mesh is then bent into a C-shaped channel, such as by using a bar folder. A rectangular filter pad may be cut larger than the outer surface of the framework, for insertion within the framework. If the filter pad is also about one-half as thick as the depth of the C-shaped channel framework, the edges of the filter pad can be folded over to fit within and seal the ends of the framework.

Other features and advantages of the present invention will appear from the following description in which the preferred embodiments have been set forth in detail in conjunction with the accompanying drawings.

BRIEF DESCRIPTION OF THE DRAWINGS

FIG. 1 is a perspective view of an air filter made according to the present invention shown mounted to a wood stove.

FIG. 2 is an isometric view of the filter of FIG. 1.

FIG. 3 is a rear elevational view of the filter of FIG. 1.

FIG. 4 is an isometric view of the sheet of mesh.

FIG. 5 shows the mesh of FIG. 4 with edge strips attached thereto.

FIG. 6 shows the mesh and edge strips of FIG. 3 formed into a framework defining a C-shaped channel.

FIG. 7 shows a filter pad with the fold lines indicated by dashed lines.

FIG. 8 shows an alternative embodiment of the air filter of FIG. 1.

DETAILED DESCRIPTION OF THE PREFERRED EMBODIMENTS

Turning now to FIG. 1, the air filter 2 is shown mounted to a wood stove 4 to cover the air intake 6 of stove 4. Cold air flows through air intake 6 into a plenum surrounding the firebox of stove 4 and out outlet 8. Exemplary of such stoves are those made by Smokey Mountain Enterprises of Asheville, N.C. For higher efficiencies stove 4 uses a fan to force air through the plenum.

Turning also to FIGS. 2 and 3, filter 2 is seen to include a framework 10 in the form of a C-shaped channel and a filter pad 12. Framework 10 includes a piece of expanded metal mesh 14 formed into a C-shaped channel and end and side edge strips 16, 18 spot welded to the edges of mesh 14. Side edge strips 18 oppose one another to define an access opening 20 therebetween.

Magnetic strips 22 are bonded to side edge strips 18. Since stove 4 is made of a ferrous material, air filter 2 is mounted to stove 4, covering air intake 6, by the magnetic attraction between magnetic strips 18 and the stove. This allows the addition of filter 2 to stove 4 without any modification to, or breach of integrity of, the stove. Removal of the filter for cleaning is likewise simplified.

Turning now to FIGS. 4–7, the method for making air filter 2 will be described. First, a piece of mesh 14 is cut to the desired size. Next, end and side edge strips 16, 18 are spot welded along the edges 24, 26 of mesh 14. Edge strips 16, 18 form a frame 28 about the periphery of mesh 14. The framed mesh is then bent to form the C-shaped channel framework 10 shown in FIG. 6. This is typically accomplished using a bar folder. Framework 6 has a length 30, a width 32 and a depth 34.

Filter pad 12 is chosen with a thickness 36, which is about one-half depth 34, and having a length 38 and a width 40, which are both greater than length 30 and width 32 respectively. Choosing filter pad 12 with such dimensions allows pad 12 to be folded along fold lines 42, 44 to double the thickness of filter pad material along the lateral edges 46 and open ends 48 of framework 10. Doubling the thickness along lateral edges 46 ensures that air passing through the lateral edges passes through filter pad 12. Likewise, folding filter pad 12 along fold lines 42 effectively covers open ends 48 with filter material ensuring complete filtration of air entering stove 4 through air inlet 6.

Referring now to FIG. 8, an alternative embodiment of framework 10 is shown. Framework 10' is similar to framework 10, however end edge strips 16' are sized so that their distal ends 50 extend past side edge strips 18' so that they abut one another. Also, end magnetic strips 52 are attached to strips 16' adjacent the ends of magnetic strips 22. This permits the air intake on a stove to be completely sealed around its periphery by magnetic strips. Mesh 14', rather than being of the expanded metal type with diamond shaped openings, has circular openings 54 for the passage of air therethrough.

Other modifications and variations can be made to the preferred embodiment without departing from the subject of the invention as defined in the following claims.

We claim:

1. An air filter for covering a recirculating air inlet of a stove, at least a portion of the region of the stove defining the air intake being a ferrous metal, the air filter comprising:
   an elongate, C-shaped channel framework having a substantially porous outer surface, an inner surface, lateral sides and open ends, said inner surface having spaced apart, parallel, solid edges defining an open area extending the length of said inner surface, the portions of said framework defining said open ends being solid, said outer surface, said inner surface and said lateral sides having the same length, said outer and inner surfaces having the same width and said lateral sides having the same depth;
   a generally flat filter pad housed within said framework; and
   a pair of spaced-apart elongate magnetic strips mounted to said parallel, solid edges, said magnetic strips extending substantially the entire length of said inner surface for fastening the air filter to cover the air intake of the stove.

2. The air filter of claim 1 wherein the width of said filter pad before mounting within the framework is greater than the width of said outer surface with the lateral edges of said filter pad folded back upon itself to compress said folded back lateral edges between said outer and inner surfaces.

3. The air filter of claim 2 wherein the thickness of said filter pad is about one-half the depth of said framework and the length of said filter pad before mounting within said framework is greater than the length of said framework so that said filter pad at least substantially fills the ends of said framework.

4. The air filter of claim 1 wherein said framework comprises a porous, C-shaped channel member and solid edge strips secured to said C-shaped channel member, said edge strips providing said solid edges and said portions of said framework defining said open ends.

* * * * *